United States Patent [19]

Kuhlman

[11] Patent Number: 5,287,646
[45] Date of Patent: Feb. 22, 1994

[54] SPRING BOBBER FOR FISHING RODS

[76] Inventor: Donald J. Kuhlman, 15570 Comstock St., Grand Haven, Mich. 49417

[21] Appl. No.: 992,163

[22] Filed: Dec. 17, 1992

[51] Int. Cl.$^5$ ............................................. A01K 97/12
[52] U.S. Cl. ....................................... 43/17; 43/25
[58] Field of Search ................................. 43/17, 25

[56] References Cited

U.S. PATENT DOCUMENTS

| | | | |
|---|---|---|---|
| 3,012,352 | 12/1961 | Loysdon | 43/17 |
| 3,529,375 | 9/1970 | Dey | 43/25 |
| 3,916,554 | 11/1975 | Hullett | 43/17 |
| 4,020,579 | 5/1977 | Snider | 43/17 |
| 4,399,631 | 8/1983 | Smith | 43/17 |
| 4,507,890 | 4/1985 | Thorne | 43/17 |
| 4,905,398 | 3/1990 | Botbyl | 43/17 |

*Primary Examiner*—Kurt C. Rowan
*Attorney, Agent, or Firm*—Alfred E. Smith

[57] ABSTRACT

An exteremely sensitive stainless steel bobber that will fit practically any fishing rod or pole. The bobber includes a first loop through which a fishing line passes; a second, very flexible loop for sensing pull exerted on the fishing line; a securing assembly for mounting the bobber on the end of a fishing pole or rod; and an indicator for signalling the presence of a biting fish.

5 Claims, 2 Drawing Sheets

SPRING BOBBER FOR FISHING RODS

BACKGROUND OF THE INVENTION

The present invention relates to fishing equipment and more particularly to an extremely sensitive spring bobber. The spring bobber is attached to the tip end of a fishing rod (or pole) and replaces the conventional floating bobber.

Fish have an instinctive ability to survive while feeding. The fish relies upon sight, sound, taste, and an incredible wit. Once a feeding fish has accepted the bait into it's mouth, the bait must meet all expectations before it will be consumed. If the expectations are not all met, the fish simply releases the food and the odds are against the fisherman most of the time when using a hook and line.

A hook, line, sinker and line float (bobber) plus a rod and bait are all used to trick a fish into biting. This offering is far from a natural presentation. Feeding fish will inhale and taste the bait, sucking if off the hook when possible. Fish will not accept the bait if it is offered in an unnatural manner. The unnatural appearance and weight of bait (and lures) and the overpowering resistance of a sinker, line float and rod tension is not natural enough for fish to normally accept in their daily feeding habits.

Using a sinker and line float the bait is suspended at a depth set by the fisherman. This may or may not be at the level of feeding fish., called the strike zone. The fisherman can see his line float and only hope that is at the proper depth to catch fish. However, under water the line, sinker and bait may be wrapped around weeds and a wrongly guessed depth will simply keep the bait too far away from the fish.

The prior art known to applicant which relates to the present invention is found in U.S. Pat. No. 3,143,822 (Schooley), U.S. Pat. No. 3,529,375 (Dey) and U.S. Pat. No. 3,950,880 (Polaszek). The Schooley patent discloses a bite signaling device comprising a leaf spring secured to a fishing rod at one end and an aperture member at the other end. The Dey patent discloses a fish bite indicator comprising a wire member bent upon itself at its midpoint to form a loop at one end with the other ends of the wire secured to the fishing rod. The Polaszek patent shows a bite signaling device having a housing attached to the end of a fishing rod, a coiled spring member mounted within the housing and a wand member attached to the coiled spring.

SUMMARY OF THE INVENTION

The invention disclosed herein comprises a spring bobber used in combination with either a casting rod or a spinning rod. The sensing element of the disclosed bobber is formed from a single strand of stainless steel wire. The wire is first bent to form a first loop portion through which the fishing line will pass, a plastic bead providing a signaling member is placed on the wire adjacent this first loop, a second much larger loop is then formed at a right angle to the first loop providing an extremely flexible member, the remainder of the wire is then bent to form parallel sections with a pair of legs extending perpendicular to the plane containing the second loop and the parallel sections. This sensing element is secured to the rod by a pin and coil spring arrangement which will be described in detail below.

It is an object of the present invention to provide an apparatus for presenting bait to feeding fish in a most natural manner.

It is a further object of the invention to provide a device that allows a fisherman to see and feel the first sign of a biting fish.

It is a still further object of the invention to provide an extremely sensitive fish bite indicator that is adaptable to most fishing rods, will do no damage to the rod when properly installed and will not alter or change the action of the rod.

It is yet another object of the invention to provide the only known castable spring bobber.

These and other objects and advantages of the present invention will become apparent upon reference to the following detailed description considered with the accompanying drawings.

DETAILED DESCRIPTION OF INVENTION

Figure 1:
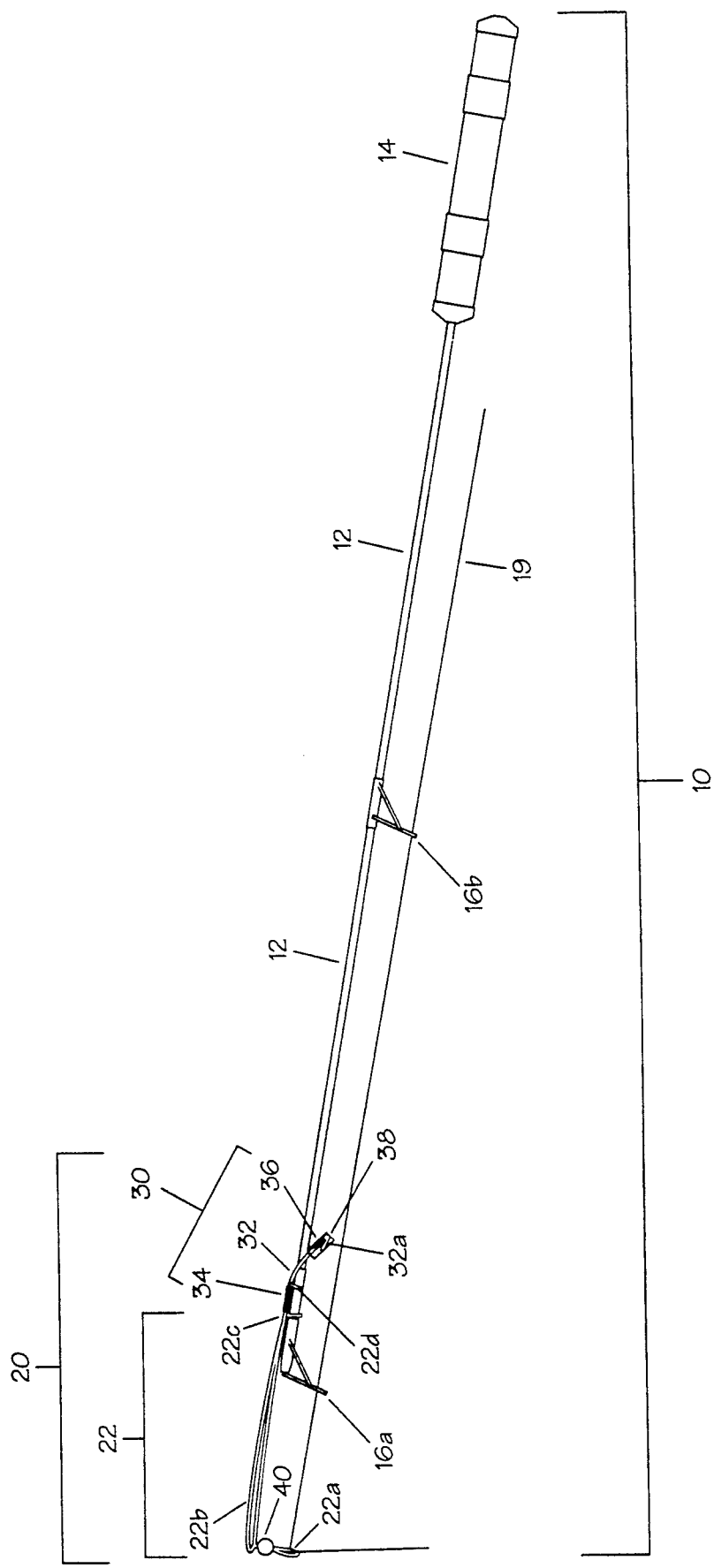
FIG. 1 is a perspective view of a fishing rod incorporating a preferred embodiment of the present invention.

Referring to FIG. 1, fishing rod 10 includes one or more rod members 12, a handle 14, and a plurality of line-guide eyes 16(a) and 16(b). A conventional spinning reel 18 is mounted on the handle 14. The spring bobber 20 is mounted on the terminal end of the rod member 12 and includes a bite sensing element 22 and a securing assemble 30. The bite sensing element is formed from a single strand of stainless steel wire to provide a loop 22(a), through which a fishing line 19 passes, a larger loop segment 22(b); and terminating in a pair of parallel segments 22(c). The segments 22(c) having a pair of depending legs 22(d), FIG. 5, which grip the sides of the rod member 12. The large loop segment 22(b) provides an extremely sensitive detector for sensing any force applied to loop 22(a) as a result of a biting fish pulling on fishing line 19. Any deflection of loop 22(b) is signalled by a colored plastic sphere 40 positioned between the small loop 22(a) and large loop 22(b).

Figure 2:
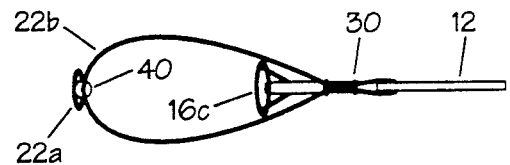
FIG. 2 is a top view of the terminal end of the rod shown in FIG. 1.

As best seen in FIG. 2 the loop segment 22(b) completely clears the tip guide eye 16(c) when a biting fish pulls down on line 19. This large loop feature makes the bobber both extremely sensitive and castable, a feature not present in any prior art fish bite signaling devices.

Figure 3:
FIGS. 3–7 illustrate the steps of attaching the spring bobber of the present invention to the fishing rod.
Figure 4:
Figure 5:
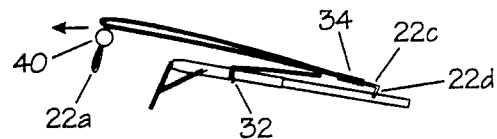
Figure 6:
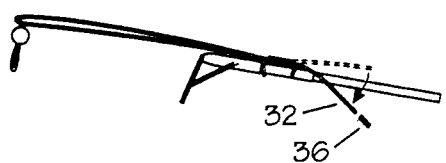
Figure 7:

The specific construction details and the method of attaching the spring bobber to a fishing rod are shown in FIGS. 3–7. FIG. 3 shows the attaching pin 32 being placed on a casting rod. FIGS. 4–7 show the bobber being attached to a spinning rod. First, the pin 32 is placed on the underside of the rod member 12 adjacent to tip guide eye 16(c) and a U-shaped portion of pin 32 is pushed onto the rod and opened or closed to make the pin fit tightly upon the rod 12. Next the pin ends as shown in FIG. 5, are pinched together and inserted into bobber spring 34 which has been placed around the terminal ends 22(c) of the bite sensing element 22. The sensing element 22 is then pulled forward to tighten the pin against the guide eye 16(c), as more clearly illustrated in FIG. 2. As shown in FIG. 6 the ends of pin 32 are pushed down along each side of rod member 12 and locking spring 36 is placed over the pin ends and pushed tight against the rod member 12. Using, for example, a pair of needle nose pliers the ends 32(a) of pin 32 are bent around locking spring 36, FIG. 7, and any excess pin wire that touches rod 12 is cut off. A piece of plastic tubing 38 is then placed over both the locking spring 36 and the bent pin ends. The plastic tubing 38 is then pushed tightly under rod 12 to firmly hold the bobber assembly in place. Each of the elements, pin 32, bobber spring 34 and locking spring 36 are, like member 22, formed of stainless steel wire to provide a rugged corrosion resistant assembly.

It is noted that the round wide loop 22(b) gives the device strength and sensitivity. The loop 22(a) provides a large eye which allows the fishing line free movement. The colored plastic sphere 40 provides an easy to see indicator under most fishing conditions. The pin 32, locking spring 36 and the plastic tubing 38 secures the device firmly to the rod without damage to the rod. The corrosion resistant steel wire and springs make the device durable and long lasting, allowing perfect movement and shape retention as well as providing for adjustment of the loop 22(b) to assure that loop 22(b) clears tip eye 16(c).

Adding the spring bobber disclosed herein to any rod can make it the most natural and effective way to deliver bait to feeding fish. With just a hook, light line and a small amount of bait, the bait after being cast, will naturally fall slowly and when passing through a strike zone feeding fish will attack it. The fish, first inhaling the bait, felling no sinker, line float or rod tension will hang onto the bait longer. From the mouth of the fish to the spring bobber, no resistance if felt by the fish because it feels and looks natural. The spring bobber will bend when the fish accepts the bait displacing the signaling bead at which time the hook may be set.

While this invention has been described with reference to a specific embodiment it will be apparent that various modifications and changes may be made without departing from the spirit of the invention, as defined in the appended claims. For example, the terminal ends 22(c) could be secured to the rod member 12 by wire wrapping, taping, gluing or similar techniques.

I claim:

1. A spring bobber for use with a fishing rod comprising: a fish bite sensing member consisting of a single strand of stainless steel wire and having a distal end portion forming a loop through which a fishing line passes, a central flexible loop portion, and a terminal end portion defined by parallel positioned end segments of said wire for attachment to said fishing rod; means for securing said terminal end portion to said fishing rod, said securing means comprising a pin member having parallel end segments terminating in a U-shaped portion perpendicularly positioned with respect to said parallel segments; and a coil spring member surrounding both the terminal end portions of said sensing member and said pin member parallel end segments.

2. A spring bobber as set forth in claim 1 wherein said securing means further includes a locking spring member surrounding the terminal end portion of said sensing member.

3. A spring bobber as set forth in claim 2 wherein the extremities of said terminal end portion are bent over said locking spring, and further including a length of plastic tubing surrounding said locking spring and said terminal end portion extremities.

4. A fishing rod comprising: an elongated member having a handle mounted at one end thereof, a plurality of line-guide eyes spaced along the length of said rod and at the tip thereof, and a spring bobber mounted on said rod adjacent the tip line-guide eye, said spring bobber comprising; a fish bite sensing member consisting of a single strand of stainless steel wire having a distal end portion forming a loop though which a fishing lines passes, a central flexible substantially round loop portion having a diameter substantially greater than the diameter of said distal end portion loop, and being sufficiently large to permit the central loop to clear the tip line-guide eye when flexed, and parallel terminal end segments for attachment to said fishing rod; means for securing said terminal end segments to said fishing rod, said securing means comprising, a pin member having parallel extending end segments terminating in a U-shaped portion perpendicularly positioned with respect to said parallel segments, and a coil spring member surrounding both the terminal end segments of said sensing member and said pin member parallel end segments: and a signalling means mounted on said bite sensing member between said distal end portion and said central portion.

5. A fishing rod as set forth in claim 4 wherein the extremities of said terminal end portion are bent over said locking spring, and further including a length of plastic tubing surrounding said locking spring and said terminal end extremities.

* * * * *